United States Patent
Chatty et al.

(10) Patent No.: US 10,866,878 B2
(45) Date of Patent: Dec. 15, 2020

(54) METHOD, SOFTWARE AND PROCESSING UNIT FOR VERIFYING PROPERTIES OF INTERACTIVE COMPONENTS

(71) Applicant: ECOLE NATIONALE DE L'AVIATION CIVILE, Toulouse (FR)

(72) Inventors: Stéphane Chatty, Toulouse (FR); Mathieu Magnaudet, Toulouse (FR); Daniel Prun, Pinsaguel (FR)

(73) Assignee: ECOLE NATIONALE DE L'AVIATION CIVILE, Toulouse (FR)

(*) Notice: Subject to any disclaimer, the term of this patent is extended or adjusted under 35 U.S.C. 154(b) by 0 days.

(21) Appl. No.: 15/186,073

(22) Filed: Jun. 17, 2016

(65) Prior Publication Data
US 2016/0371168 A1 Dec. 22, 2016

(30) Foreign Application Priority Data
Jun. 19, 2015 (EP) .................................... 15305950

(51) Int. Cl.
- *G06F 9/44* (2018.01)
- *G06F 11/36* (2006.01)
- *G06F 8/38* (2018.01)
- *G06F 8/34* (2018.01)

(52) U.S. Cl.
CPC ............ G06F 11/3608 (2013.01); G06F 8/34 (2013.01); G06F 8/38 (2013.01)

(58) Field of Classification Search
None
See application file for complete search history.

(56) References Cited

U.S. PATENT DOCUMENTS

| 6,108,698 A * | 8/2000 | Tenev | G06F 17/30958 707/E17.011 |
| 7,620,946 B2 * | 11/2009 | Russell | G06F 17/5045 717/126 |
| 2008/0301553 A1 * | 12/2008 | Basu | G06F 8/10 715/700 |
| 2013/0055221 A1 * | 2/2013 | Murthy | G06F 11/3608 717/132 |

(Continued)

FOREIGN PATENT DOCUMENTS

| CN | 103312592 A | 9/2013 |
| JP | 2013125441 A | 6/2013 |

OTHER PUBLICATIONS

Mnauel Sousa et al., "Formal Verification of Safety-Critical User Interfaces: A Space System Case Study", 2014, pp. 62-67.*

(Continued)

*Primary Examiner* — Wei Y Zhen
*Assistant Examiner* — Lanny N Ung
(74) *Attorney, Agent, or Firm* — Meagher Emanuel Laks Goldberg & Liao, LLP

(57) ABSTRACT

The invention relates to the verification of properties of an interactive component having a recursive tree structure of subcomponents. The verification comprises creating an oriented graph from the tree, said oriented graph comprising arcs for the child relationships of the tree, and arcs for couplings creating upon couplings between the components. The verification comprises creating a second graph representative of the property, and verifying if the second graph is exhibited within the first oriented graph.

15 Claims, 6 Drawing Sheets

(56) References Cited

U.S. PATENT DOCUMENTS

2013/0304755 A1* 11/2013 Zhou .................. G06F 11/3608
707/758

OTHER PUBLICATIONS

Manuel Sousa et al., "Formal Verification of Safety-Critical User Interfaces: A Space System Case Study", XP055172416, Retrieved from the Internet: URL:http://www.chi-med.ac.uk/publicdocs/WP217.pfd, Association for the Advancement of Artificial Intelligence (www.aaai.org), pp. 62-67, 2014.
European Search Report for 15305950.6, dated Sep. 23, 2015.
English Translation of First Office Action and Search Report for corresponding CN 201601444712.1 dated Jul. 4, 2018.

* cited by examiner

METHOD, SOFTWARE AND PROCESSING UNIT FOR VERIFYING PROPERTIES OF INTERACTIVE COMPONENTS

FIELD OF THE INVENTION

The present invention relates to the verification of properties on interactive software. More specifically, it relates to the formulation and verification of properties on interactive components organized as hierarchical structures of interactive components within interactive software.

BACKGROUND PRIOR ART

Verification and validation are important processes in engineering. Validation consists in using available methods for checking that a system is fit for its purpose. Verifying a system consists in defining properties that said system must have at all times, and using available methods for checking that said properties are indeed guaranteed in the system.

The verification of software requires specific methods. Software components are collections of instructions that can be developed independently and assembled to produce software products. A software property is a trait or an attribute proper to a software component. The verification of software can be performed as a process that consists in checking whether a given property or set of properties is true or false on a given software product or software component. A component property is true if it is fulfilled by the software component or false if it is not fulfilled.

Test, reviewing and analysis are the main established software verification processes.

Test consists in submitting the system (a software product or a software component) to a controlled environment, observing its behavior and comparing it to a reference, for example a specification. Test is a simple method, easy to use and very trustable, but it can be very costly if the controlled environment is complex to build; this is particularly true when testing the interactions of software with users or the environment.

Reviewing consists in submitting the system to one or several reviewers for examination, comment or approval. Reviewing is simple and flexible, but its cost increases dramatically with the desired reliability level, and its efficiency decreases with the complexity of software because finding errors or checking properties is difficult when the structure of software is difficult to read.

Analysis consists of building a model of the system, verifying and validating this model. Then if a model holds a property and if the system is built according to said model, said final system holds said property. Various modeling techniques and model analysis methods exist. For example, state-transition models can be built and the graph resulting from an exhaustive simulation can be used to support verification of temporal related properties like LTL or CTL as described in Baier et al. *Principles of model-checking*, MIT Press, ISBN 026202649X, 9780262026499. Another approach consists in performing mathematical proof on a model by applying inference rules with the objective to check that a property is preserved when adding more detail to the model as described by Abrial, *The B-Book—Assigning Programs to Meanings*, 2005. Alternatively, an abstract semantic can be extracted from the source code of programs, and used for verifying properties as described by Cousot, et al. *Abstract interpretation: A unified lattice model for static analysis of programs by construction or approximation of fixpoints*. In Proc. ACM POPL'77, ACM (1977), pp. 238-252.

Analysis is a very efficient method in term of coverage and reliability, but its complexity requires the intervention of specialists. In addition, when the analysis is performed on full software products, only a limited set of properties is available for verification. For instance, it may be possible to guarantees that certain types of software failures will be impossible, but not that the software responds properly to user actions. Defining analysis algorithms for new properties is generally beyond the abilities of a skilled person, and programmers must content themselves with the available list of checkable properties.

More generally, the efficiency and the cost of verification methods degrade when the semantic distance increases between the language used to create the software and the language used to formulate properties. In particular, it is difficult to verify high-level properties of large software when said software is expressed as a non-structured collection of small low-level components. For example, if a software product is programmed as a collection of computation instructions, and said software product is supposed to perform complex computations that depend on external conditions and on past history, then building a controlled environment for tests will be costly, reviewing will be difficult, and analysis will not be available for properties such as "this part of the display will only change when this software receives this sequence of inputs".

Software architectures are sets of rules used to organize software components in smaller reusable components. Software architectures are concerned with how both software execution and data are organized. Software architecture can be supported by programming conventions or by programming languages. For example, functional languages help to organize software in units of computation named functions. Similarly, object-oriented languages help to organize software in components that are both units of data and units of computation.

The software architectures enforced by programming languages can be used to improve the usefulness of verification methods, by making it possible to formulate and check properties on individual components, thus reducing the distance between the properties and the components. A skilled person can easily define properties of an individual component and create a small controlled environment named unit test to test said properties, using the same type of programming instructions in the unit test as in the component. A skilled person can also submit a component for review and expect reviewers to be able to check properties that are expressed using the same concepts that are used to program said component. In addition, the developers of a compiler can use their knowledge of how the programming language organizes components to build models of said components and check properties on them. For example, a compiler can check if a function has unused arguments, or if the control flow in a function stops at an unexpected place.

A software architecture is recursive when the same rules that are used to create any component can be used when reusing said component to create larger components. Recursive architectures help to manage software complexity because programmers can choose to ignore the internal complexity of a component when assembling it with other components, or alternatively go into details without having to learn a new architecture. Recursive architectures make it possible for a skilled person to express component properties that can be checked using analysis techniques. A developer or specifier can express properties of a component using the characteristics of said component and its direct sub-components, and ignoring further details. Lower-level properties, if needed, can be defined for lower-level components using the same technique. Meyer, B. Applying "*Design by Contract*", in Computer (IEEE), 25, 10, October 1992, pp. 40-51 discloses a method named contract-oriented programming that relies on the definition of properties named invariants for each class of objects in an object-oriented language. Invariants are easy to define because they are close to components and can be written in the same language. The programming language compiler or run-time execution system then checks invariants. Similarly, Abrial (see reference above) discloses a method named B-Method based on the model refinement principle: more information is progressively added to a model with the conservation of validity of some properties. These approaches allow programmers to define properties at all levels of detail of their programs, even before starting to program the software components themselves.

Interactive software refers to software that accepts inputs from humans, from the physical environment or from other machines, in addition to performing computations. Nearly all modern software is interactive software. For example, text editors, video games, internet browsers, smartphone applications, and the software of aircraft cockpit displays are interactive software. Computer operating systems, the firmware of connected objects, and web servers are also interactive software. Nowadays, the diffusion of new human input and output techniques, smartphones, tablets, network connections and connected objects widely increased the number of possible combinations for designing interactive software. For example, on tablet computers, inputs can now be entered using a touch-sensitive surface, a connected object such as an air pointer, and sensors such as a gyro, an accelerometer or a thermometer.

Interactive software can be contrasted with computation-oriented software. Computation-oriented software has a start and an end, is aimed at computing results from an initial set of data. In contrast, interactive software waits for inputs and triggers reactive behaviors or computations depending on the inputs received.

The desirable properties of interactive software are those of traditional software, plus a very large number of properties named interaction-oriented properties. Interaction-oriented properties are related to how the software responds to its inputs and how users perceive its outputs, and to how the software helps users to perform a given task. Only a few interaction-oriented properties apply to all applications, and most must be defined relatively to the application at hand.

The methods used for verifying traditional software are either too costly or inappropriate for checking interaction-oriented properties. Some traditional methods are, to a certain extent, efficient at helping developers to prevent crashes of an application. However, traditional methods of verification of properties are not suitable for verifying interactive properties, for example verifying if a button will always be visible, whatever the inputs of the user and the context of the application. Additional methods have been defined, but they are partial and do not cover neither the range of interactive software nor the range of properties described above. It becomes necessary to provide verification techniques that encompass interactive software more widely and support more properties.

Tests can be performed on interactive software by making end-users provide the software with possible inputs, and verifying that the behavior of the application is both consistent with its specification and compatible with how users operate it. This method is widely used, but it is very costly and time-consuming, and lacks exhaustiveness because an end-user cannot manually execute all possible combinations of inputs.

Reviewing interactive software is very difficult because the complexity of interactive behaviors is beyond what a skilled can comprehend by only reading programs. Reviewers must create models, and perform analysis methods by hand, if they want to check behavior-oriented properties.

Model based analysis methods have been defined to support the verification of components in interactive software, generally focusing on components with a high level of abstraction. For example many models describe information related to Abstract User Interfaces (AUI). A lot of details related to the concrete user interfaces, including the description of input and output modalities, are not or little included in the models, which makes hard or even excludes the verification of some properties. For example, Thimbleby, H. and Gow, J. *Applying graph theory to interaction design*. In Proc. EIS 2007, LNCS 4940, Springer (2008), 501-518 discloses a method for applying static analysis based on graph theory to the verification of properties of software throughout interactions of the user. Thimbleby and Gow represent the states of the interactive software as nodes of a graph, the arcs of the graphs being inputs of end user that determine a change of the state of the interactive software. It then discloses a method for checking properties of the software in all possible states. However, the Thimbleby and Gow publication discloses global states and transitions for the whole software, only related to high level of abstraction (the task level and to the abstract user interface level). The absence of low level details (related to the concrete user interface and to the final implementation) prevents from addressing verification of properties related with these levels.

More generally, in order to support fully automated verification as in compilers, one must ensure that what programmers or designers produce contain all the necessary information to derive an abstract interpretation. In addition, since many interaction-oriented properties can only be defined for a given component and not on a general basis, it is desirable that programmers can define properties that are as close to components as possible, in development processes that are similar to contract-oriented programming. Any part of the software written with a traditional language foils this approach, because it would be extremely difficult to reconstruct the impact of this piece of code on the program's interactive behavior automatically.

Traditional programming languages, such as C, C++, Lisp or Java, have been derived from programming languages focused on computation rather than interaction. They primarily operate using functions calls, that are effective at performing calculations, but not at managing interactions with the environment. With these languages, interactions are managed using a system of events and callbacks, or variants such as signal and slots. Events are created by the system when an interaction occurs (for example when the user clicks on a mouse), then passed to special functions defined by programmers and named callback functions, whose address is registered and associated to a type of input. This defines a non-recursive architecture that relies at low level on functions and at high level on interaction. The properties defined at high level are expressed in an interaction-oriented language, but the components are written a traditional language focused on computation operations. Consequently the semantic distance is high, and developing algorithms that check properties is extremely difficult. For example, the control flow is too complex to determine whether the behaviors of two objects are interdependent, or if a graphical object is always visible.

In addition, the interactive properties of interactive systems do not depend only on the software part of said interactive systems, but also on the behavior of the input and output devices or connected objects that the software operates. The behavior of these sub-systems can be very complex and dramatically modify the behavior of the whole system, and therefore its properties. Therefore, it is desirable to provide a solution not only for checking properties on interactive software based on the source of said software, but also for checking properties of interactive sub-systems that are not built as software programs or whose sources are not available. It should be possible to create a model of such sub-systems in a language that is compatible with the language used for programming the software sub-systems, to combine the model with the software source, and to check properties on the whole resulting system description.

The present application aims at solving the above mentioned problems, by providing solutions for:
programming or modeling interactive systems;
then formulating properties for individual components at various levels of detail of said systems in a language that is close the programming or modeling language;
then automatically checking said properties.
More specifically, it aims at providing tools for automatically checking properties of a component of an interactive system, the rules of validation of properties being automatically updated when modifying or adding sub-components in the component or a model of said component.

SUMMARY OF THE INVENTION

To this effect, the invention discloses a method for verifying a property of an interactive component, said interactive component being represented as a tree of child components, said tree of child components comprising a control structure child component defining a coupling between a first child component and a second child component, the second child component being activated upon the activation of the first child component, said method comprising: creating a first oriented graph, representative of the interactive component, nodes of which comprise the first child component and the second child component; obtaining a second graph, representative of the property; verifying one of the presence or the absence of the second graph in the first oriented graph, wherein creating the oriented graph comprises: creating a first arc between the interactive component and a child of said component; creating a second arc between the first child and the second child.

Advantageously, obtaining a second graph, representative of the property comprises retrieving said second graph in a library.

Advantageously, obtaining a second graph, representative of the property comprises creating said second graph in a library.

Advantageously, verifying one of the presence and the absence of the second graph further comprises verifying a value of an attribute of a node of said second graph.

Advantageously, the method further comprises verifying if said value of an attribute is subject to change upon the presence of the second arc.

Advantageously, displaying the interactive component comprises displaying a subset of child components.

Advantageously, the order of display is determined by the structure of the tree.

Advantageously, the order of display is the order of a depth-first search algorithm.

Advantageously, the property is relative to the structure of the interactive component.

Advantageously, the property is relative to the behavior of the interactive component.

Advantageously, the method further comprises associating a condition of a type of a node with the property of the interactive component.

Advantageously, the method further comprises associating a condition of a value of an attribute of a node with the property of the interactive component.

Advantageously, at least one component is representative of one of a series of action to be performed by a human, or a procedure to be followed by a human.

The method also discloses a computer program product for verifying a property of an interactive component, said interactive component being represented as a tree of child components, said tree of child components comprising a control structure child component defining a coupling between a first child component and a second child component, the second child component being activated upon the activation of the first child component, said computer program product comprising: code instructions for creating a first oriented graph, representative of the interactive component, nodes of which comprise the first child component and the second child component; code instructions for obtaining a second graph, representative of the property; code instructions for verifying one of the presence or the absence of the second graph in the first oriented graph, wherein code instructions for creating the oriented graph comprise: code instructions for creating a first arc between the interactive component and a child of said component; code instructions for creating a second arc between the first child and the second child.

The method also discloses a processor configured for verifying a property of an interactive component, said interactive component being represented as a tree of child components, said tree of child components comprising a control structure child component defining a coupling between a first child component and a second child component, the second child component being activated upon the activation of the first child component, said processor being configured for: creating a first oriented graph, representative of the interactive component, nodes of which comprise the first child component and the second child component; obtaining a second graph, representative of the property; verifying one of the presence or the absence of the second graph in the first oriented graph, wherein creating the oriented graph comprises: creating a first arc between the interactive component and a child of said component; creating a second arc between the first child and the second child.

The invention permits to automatically verify interactive properties of interactive software.

The verification of interactive properties remains valid even upon modifications of a component to which the property applies, or other components of the application.

A method according to the invention is suitable for checking properties of tree-structured interactive components.

A method according to the invention permits the definition of a predetermined set of properties that apply to different component types.

A method according to the invention eases the testing of interactive applications.

A method according to the invention reduces the testing time of interactive applications.

A method according to the invention is suitable to verify the properties of interactive software during the development of software, for example during the compilation.

A method according to the invention is suitable to verify the properties of interactive software at runtime.

A method according to the invention may be used for verifying that software complies with a specification or a norm.

The proposed solution also applies to checking properties on hybrid interactive systems whose components consist of hardware, software, procedures and human behavior.

A method according to the invention is suitable to verify if an interactive system complies with a specification, when this system is formed of software components, hardware components, procedures and human behavior.

A method according to the invention is suitable to verify if successive versions of the system still complies with existing requirements and specifications.

A method according to the invention is suitable to progressively accumulate requirements and specifications for an interactive system as they are discovered, and verify that all future versions of the system comply with these new requirements and specifications.

A method according to the invention is suitable so verify procedures and human organizations.

A method according to the invention is suitable to automatically adapt interactive software to properties of components detected in their environment, so as to ensure that properties of the system constituted of the interactive software and the environment are maintained.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

In this specification, the invention will be described by way of examples relative to components of the Djnn platform. The Djnn platform, available at http://djnn.net/, is a language and programming tool developed by the applicant for designing interactive applications by assembling interactive components. The naming of the component types in this specification refers to their name in the Djnn platform. The applicant also disclosed a processing unit, software and method for defining and controlling the execution of interactive components in the European Application no 15305949.8 filed the same day than the present application. The principles disclosed in this application are the basis of Djnn language, as well of other languages for expressing interactive components.

However, the invention is applicable to other languages, and a skilled man can easily define new properties while remaining under the scope of the invention. The components and implementations described in this specification are provided as non limitative examples only, and do not limit in any way the scope of the invention, which is defined in the appended claims Notably, the invention can be used not only on software components that have been produced with a language that follows the principles described in European Application no 15305949.8, but also on software, hardware or otherwise systems that exist independently and have been modeled using said language. For the purpose of this invention, it makes no difference whether the system described is executed from its description or otherwise. In a number of embodiments of the invention, it is also possible to model anticipated human behavior as a component. This is notably possible in cases wherein a human behavior can be determined, and consists in receiving information from an interactive system, and performing actions on an interactive system. Such anticipated human behavior can be defined as a set of procedures that humans are expected to follow and a set of possible behaviors that can be anticipated using scientific knowledge or observation. It is further possible to have systems with a mix of software, hardware, procedures, possible human behavior, and/or human components. For example, a mix of software and human behavior components allows verifying a complete interaction between a human and an interactive software, if the human performs a defined behavior, and a mix of possible human behavior and procedures allows to verify the validity of the procedures. Similarly, a mix of components representing procedures, organizations and human behavior allows to verify the validity of procedures and organizations.

The invention can also be used to create interactive software that automatically evaluates behavioral properties of other components such as humans, procedures and organizations, and uses this to automatically adapt their own behavior.

Figure 1A:
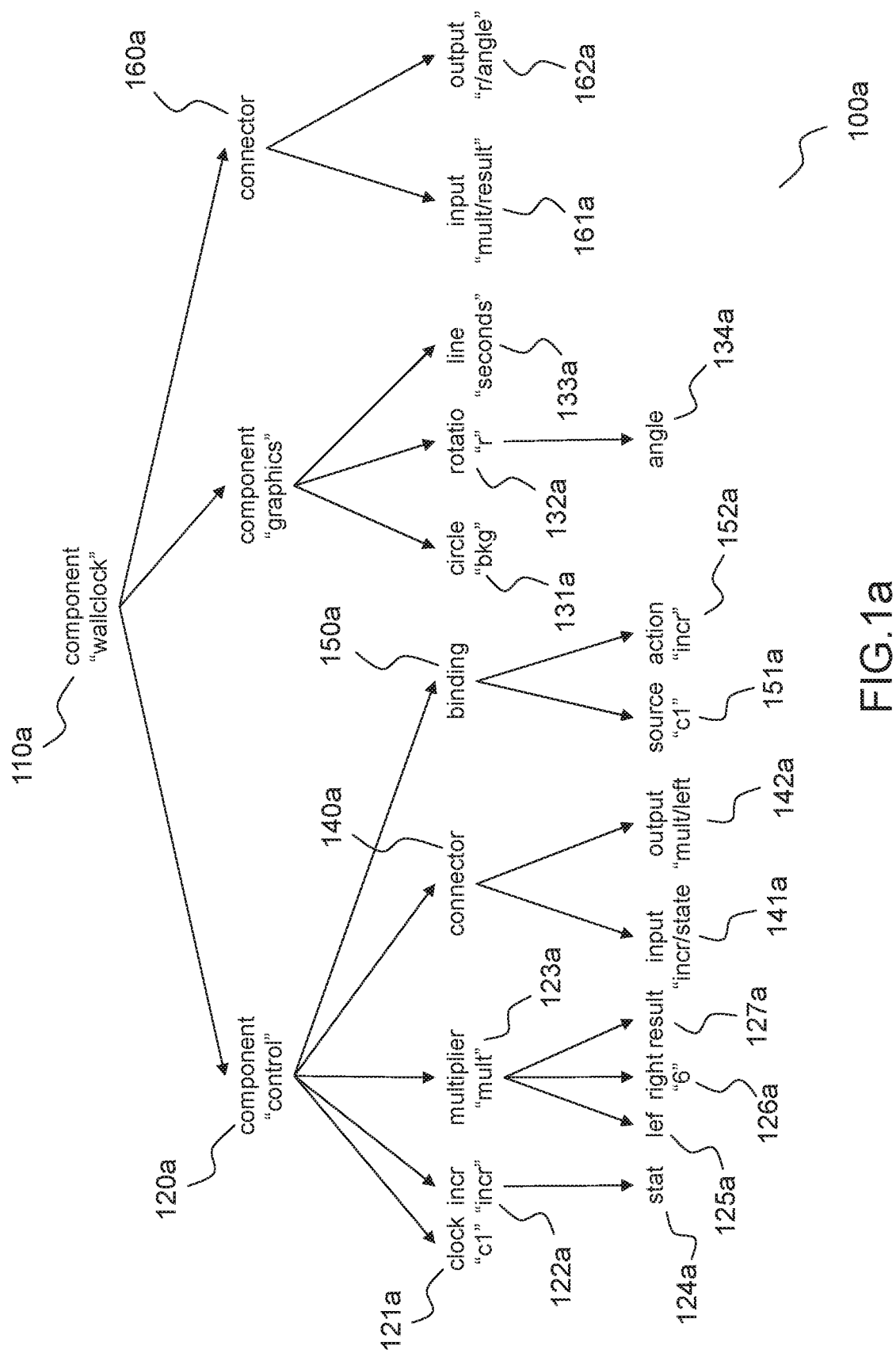
FIGS. 1a, 1b and 1c display three representations of an interactive application comprising a tree of interactive components, respectively on the form of a Xml file, a tree and a display.
Figure 1B:
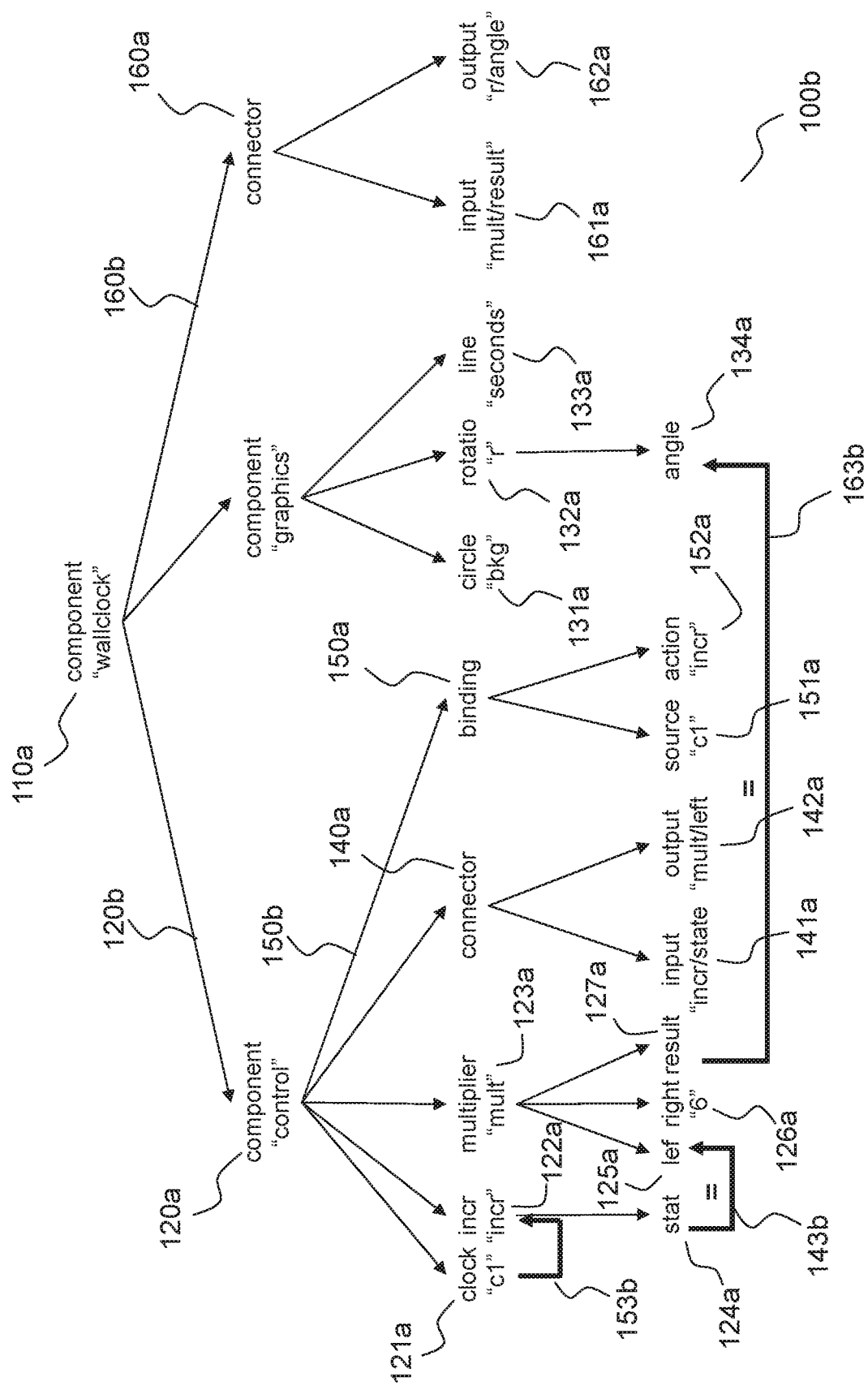
Figure 1C:
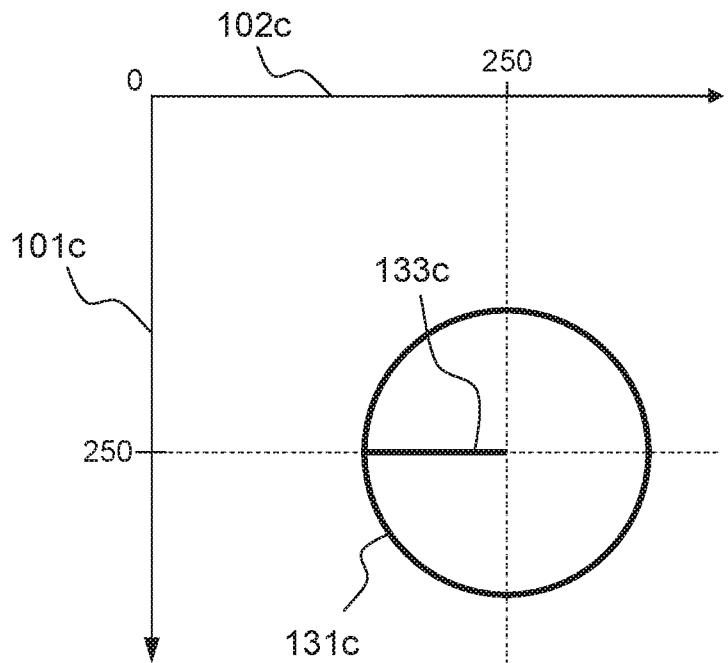

FIGS. 1a, 1b and 1c display respectively a tree of components, an oriented graph derived from this tree by a method in a number of embodiments of the invention and the layout of a wallclock at the initialization of the tree.

Said tree of components can be directly expressed in a language for developing interactive applications, such as the Djnn language. It may also be built by modeling an existing application on the form of a tree of components which comprises control structure components.

FIG. 1a display a tree 100a of subcomponents of an interactive application in an embodiment of the invention. More generally, an application can be considered as a large component, and the principles of the invention apply to both components that may be re-integrated within larger components or application, and applications. In the remaining of the specification, the symbol "/" will be representative of a parent-child relationship in the tree, between a component and one of its subcomponents. The component "wallclock" 110a has three subcomponents "control" 120a, "graphics" 130a and "connector" 160a. The component "control" 120a has:

a first subcomponent clock "c1" 121a that manages a clock.

In this example the clock is configured by default for emitting a tick every ms. In other embodiments of the invention the frequency of emission of ticks may be defined in a sub-component of the clock;

a second subcomponent incr "incr" 122a which increments its subcomponent state 124a when activated;

a third component multiplier "mult" 123a that multiplies its subcomponent left 125a by its subcomponent right 125a whose value is always "6" into its subcomponent result 127a when activated;

a fourth component connector 140a. The effect of a component connector is notably disclosed in European Application no 15305949.8: its first subcomponent 141a references the component 122a, and its second subcomponent 142a references the component 125a. When it is active, the connector copies the value of the component state 124a into the component left 125a upon each modification of the component state 124a;

a fifth component binding 150a The effect of a component binding is notably disclosed in European Application no 15305949.8: its first subcomponent source 151a references the component 121a, and its second component 152a references the component 124a. When the binding 150a is active, the component 124a is activated upon each activation of the clock "c1" 121a The component "graphics" 130a has three subcomponents circle "bkg" 131a, rotation "r" 132a with one sub-component angle 134a, and line "seconds" 133a.

A second component connector 160a has an input subcomponent 161a that references the component "mult"/result 127a and an output subcomponent 132a that references the component "r/angle" 134a: when the connector 160a is active, the value of "mult/result" 127a is copied into "r/angle" 134a upon each modification of "mult/result" 127a.

The behavior of the component is thus the following: the component "graphics" 130a and its subcomponent define the layout of the component "wallclock" 110a: it displays a wallclock comprising a circle and a needle of seconds, represented by a line drawn by the component 133a, with a rotation whose angle is defined by the component angle 134a. Each second a tick of the clock occurs, and the component 121a is activated. While the binding 150a is active, upon each activation of the component 121a the component 122a is activated. Thus, every second the component incr "incr" 122a is activated, and its state 124a is incremented. Incrementing the state of the component 124a activates it. While the connector 140a is active, its value is copied upon each activation into the left component 125a, which in turn activates the component 125a and its father the multiplier 123a. The activation of component 123a multiplies the value of the left component by the value of the right component, which is always 6, into the result component 127a. This activates the component 127a. While the connector 160a is active, the value of result 127a is copied into the component angle 134a. This activates the component angle 134a, which in turn updates the layout of the application by turning the needle of seconds.

Thus, the combination of components including control components such as bindings and connectors makes the angle of the needle be updated every second. Since the clock ticks 60 times per minute, and the result that will be copied into the angle value is multiplied by 6, the needle will turn every minute by 360°. In a number of embodiments of the invention, upon the activation of the component, all subcomponents are activated in a predefined order depending on their position. For example, they can be activated successively in an order defined by a depth-first search algorithm. The activation of graphical component can trigger their vizualisation.

One of the objectives of the invention is to be able to demonstrate a set of properties of a component. In this example, the properties can be: that the needle of seconds is always visible, that the needle of seconds is updated every seconds, and that it makes a full turn in 60 seconds.

In a number of embodiments of the invention, the tree 100a is created by an interpreter parsing an XML file, which may for example comprise the following XML lines:

```
<component name="wallclock">
    <component name="control">
        <clock name="cl" period="1000"/>
        <incr name="incr"/>
        <multiplier name="mult" left="0" right="6">
        <connector in="incr/state" out="mult/left"/>
        <binding source="cl" action="incr"/>
    </component>
    <component name="graphics">
        <circle name="bkg" cx="250" cy="250" r="100"/>
        <rotation name="r" cx="250" cy="250" a="0"/>
        <line name="sec" x1="250" y1="250" x2="250" y2="150"/>
    </component>
    <connector in="control/mult/result" out="graphics/r/a"/>
</component>
```

Each component and subcomponent is defined by an XML markup, types of components being defined by the type of the markup and attributes of the components being initialized with the values of the attributes of the markup. The structure of the tree is directly derived from the structure of the markups. For example, the root node "wallclock" will create the component 110a, and its three children "control", "graphics" and connector will respectively be parsed for creating subcomponents 120a, 130a and 160a. The components can be initialized with a standard class "component", or a more specialized component class such as a connector component if the name of the class is known by the interpreter.

In other embodiments of the invention, the tree 100a can be created by executing lines of codes in an environment of executions that support Djnn functions and libraries.

For example, the following Java lines of code can be used for creating the tree 100a in a Java environment with Djnn libraries:

```
wallclock = new Component ("wallclock");
control = new Component(wallclock, "control");
cl = new Clock (control, "cl", 1000);
incr = new Incr(control, "incr", 1);
new Multiplier(control, "mult", 0, 6);
new Connector(control, 0, incr, "state", mult, "left");
new Binding(control, 0, cl, 0, incr, 0);
graphics = new Component(wallclock, "graphics");
new Circle (graphics, "bkg", 250, 250, 100);
new Rotation(graphics, "r", 0, 250, 250);
new Line(graphics, "seconds", 250, 250, 250, 150);
new Connector(wallclock, 0, control, "mult/result",graphics, "r/angle");
```

The "new" keyword is used for creating a component or a subcomponent. When creating a subcomponent, its father is provided as the first argument of the constructor of the Java class. Others parameters for initializing the values of the attributes of the components and subcomponents are provided to the constructor.

The present invention discloses both a method for defining and a method for verifying a property of a component comprising a tree of subcomponents. Each of these methods rely on creating an oriented graph comprising subcomponents of the tree. Properties can be defined for each component in a tree of components, therefore allowing to define properties at various levels of detail while expressing said properties in a language close to the language used for defining components.

FIG. 1b displays an example of oriented graph created by a method in an embodiment of the invention, said oriented graph being built in accordance to the tree 100a.

The oriented graph 100b comprises the components and subcomponents 110a, 120a, 121a, 122a, 123a, 124a, 125a, 126a, 127a, 130a, 131a, 132a, 133a, 134a, 140a, 141a, 142a, 150a, 151a, 152a, 160a, 161a and 162a of the tree 100a. in other embodiments of the invention, an oriented graph created by a method according to the invention comprises only a subset of the subcomponents of the tree. For example, it may comprise all subcomponents except the control structure subcomponents 140a, 150a and 160a.

The oriented graph 100b comprises a plurality of arcs. Some of them, for example the arcs 120b, 150b, 160b, correspond to a child relationships between the component and subcomponents. Other arcs represent couplings. For example the arc 153b is created according to the binding 150a, the arc 143b is created according to the connector 140a, and the arc 163b is created according to the connector 160a.

In a number of embodiments of the invention arcs of the graph thus includes all arcs of the tree; arcs of the graph also includes arcs modeling the coupling created by bindings (when a binding is defined between a components S to a component A, then an arc is added to the graph between S and A). Bindings to be considered can be sub-components of a complex component. In the case of a connector between an input and output sub-components, an arc is added from input to output sub-components. In the case of a FSM containing one transition between a state sub-component named S and a state sub-component named D and activated by an input sub-component named I, an arc is added from I sub-component to the state sub-component S of the FSM. Additional links are similarly added in case of presence of additional transitions.

FIG. 1c displays the layout of a wallclock at the initialization of the tree 100a.

The clock 110c is displayed in a frame of reference of an application comprising a vertical axis 101c and an horizontal axis 102c. The origin of the frame of reference is located in the top-left corner of application or screen. The wallclock 110c is represented by a circle 131c and a line 133c that represents the needle of seconds, which respectively correspond to subcomponents 131a and 133a.

The circle 131c is initialized with a radius of 100 and coordinates (250, 250) in the frame of reference. This value may be retrieved for example by parsing the markup <circle name="bkg" cx="250" cy="250" r="100"/> in an XML file, or creating a circle object by executing the line new Circle (graphics, "bkg", 250, 250, 100); of Java code.

The needle 133c is initialized between two points of respective coordinates (250, 250) and (250, 150). These values may be obtained for example by parsing the markup <line name="sec" x1="250" y1="250" x2="250" y2="150"/> of an XML file, or executing the line new Line(graphics, "seconds", 250, 250, 250, 150); of Java code.

The reader is now supposed to be familiar with the methods for creating tree of components using an XML file or Java code, and the methods for creating an oriented graph from a tree of components. The following pictures will display directly oriented graphs for verifying properties in a number of embodiments of the invention, and the way properties are defined and verified will be explained with reference to these figures.

Figure 2:
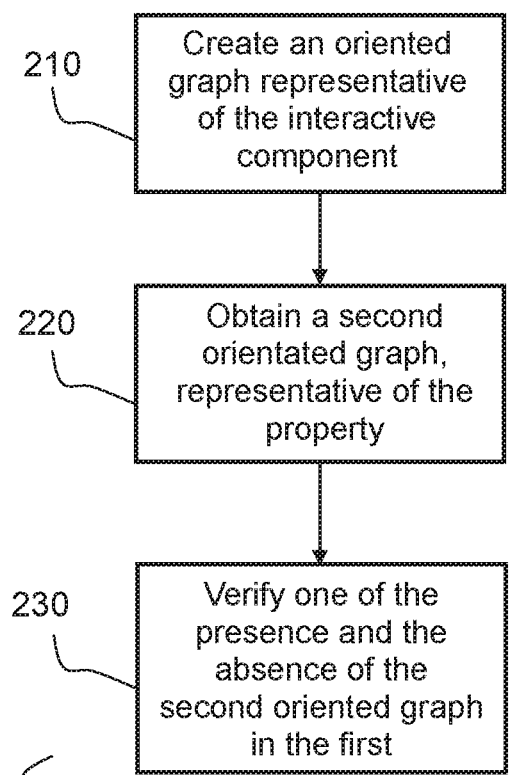
FIG. 2 displays a method for verifying a property of an interactive component in a number of embodiments of the invention.

The FIG. 2 displays a method for defining a property of an interactive component in a number of embodiments of the invention.

The method 200 applies on an interactive component, said interactive component being represented as a tree of child components, said tree of child components comprising a control structure child component defining a coupling between a first child component and a second child component, the second child component being activated upon the activation of the first child component. The method applies for example to the component 100a, or more generally on any interactive component disclosed in European Application no 15305949.8 filed by the applicant the same day.

The method 200 comprises a step 210 of creating an oriented graph representative of the interactive component, nodes of which comprise the first child component and the second child component. Examples of methods for creating an oriented graph notably comprise creating a first arc between the interactive component and a child of said component, and creating a second arc between the first child and the second child, and examples of said method are described with reference to FIG. 1 for creating the oriented graph 100b.

The method further comprises a step 220 of obtaining a second graph, representative of the property.

Obtaining said a second graph may be performed by retrieving a graph from a library of prototype graphs associated to different properties. The second graph may also be created for verifying the property. In other embodiments of the invention, said second graph may be obtained by adapting a prototype graph representative of a type of properties. In a number of embodiments of the invention, the second graph is also an oriented graph.

The construction of the second graph depends on the property to define. For example, graph invariants can be created for proving the static interface of components. This is required when different developers build or evolve interactive components in parallel and then combine them. This verification ensures that a component offers a static interface as previously defined in its specification.

The static interface of a component is called signature. The signature of a component is defined by the set of its sub components. For example the signature of a widget can be made of 2 sub-components: width and height. The signature of a rectangle is made of position sub-component (including sub-sub components X and Y), size sub-component (including sub-sub-components width and height), size of rounded corner sub-components (including horizontal and vertical size), mouse pressed event sub-component (including sub-sub-components position X and Y), mouse release event sub component, mouse move event sub-component (including sub sub components X and Y), mouse enter event sub-component and mouse leave event sub-component.

A property related to a static interface of a component can be translated into a second graph. In this case, the graph invariant is made of a root component and its sub-components composing the interface.

Said second graph can also be used for defining properties relative to correct formation of the application.

It is possible to define the well-formation of an application by defining a sub-set of rules that shall by complied by sub-components which are assembled in a correct manner.

Examples of well formed rules are: bindings refer to defined source and action sub-components (property 1), Switches contains at least one sub-component (property 2), FSMs contain states and transitions such that at least one transition allows to reach a state (property 3).

For example, property 1 can be translated in a second graph made of component source and component action and an arc from component action to component source.

Other examples of the second graph is related to the existence of a control flow connections between 2 components. This is required when different developers build or evolve interactive components in parallel and then combine them. Such an invariant may be defined by defining a path from a component A to a component S.

The method 200 further comprises a step 230 for verifying one of a presence and an absence of the second graph in the first oriented graph.

Examples of properties verified by the presence of the second graph include properties on the layout of the components. For example, the presence of a second graph comprising a rectangle and an opacity component on its left can be used for proving that an opaque rectangle exists within the component. They also include properties relative to the correct formation of the interactive component. For example, proving that a FSM is correctly formed can be proven by a second graph, representative of a well-formed FSM is present within the first oriented graph.

Examples of properties verified by the absence of the second graph include for example properties relative to the layout of components. For example, the absence of a second graph comprising a rectangle and a graphical component on its right is sufficient to prove that the rectangle is not masked by another component.

The presence or absence of a second graph can also be defined conditional upon values of attributes of the nodes of said second graph. For example, proving that a rectangle is not masked by another component can be performed even if a second graph comprising the rectangle and a second component on its right, if the borders of said second component do not overlap with the borders of the rectangle. This can be verified by comparing the attributes relative to the size and position of the second component to the parameters relative to the size and position of the rectangle.

In a number of embodiments of the invention, values of attributes can also be tested in relation to a context of execution of the interactive component. For example, the verification of properties relative to the layout of the component can be verified using the resolution of the screen on which the component will be displayed in parameter.

In other embodiments of the invention, the use of the arcs that created by the couplings between components permit to verify not only the immediate value of parameters, but also if these value are subject to change. For example, when verifying the opacity of a rectangle, the absence of an arc representative of a coupling directed to the value of opacity is sufficient to prove that this value will not change whatever the context of execution and inputs.

In a number of embodiments of the invention, the method 200 is executed during the development of an interactive component or application, in order to define precise properties that shall be verified afterwards, for example in non-regression tests or for communicating specifications in a development team. Graph invariants may be for example defined by a user or automatically.

In other embodiments of the invention, the method 200 can be executed by during the session of execution of the component or application. This is for example the case for invariants that can be defined automatically, for example invariants relative to the correct formation of the application In a number of embodiments of the invention, a property can be verified by verifying a plurality of sub-properties. For example a property stating that a rectangle is always visible can be proven by proving the following sub-properties:
A) The rectangle exists, and there exist an opacity component on its left, with a value of opacity higher than 0.5;
B) The rectangle exists, and there is no component that overlaps it on its right.

Sub-properties can also relate to different elements that characterize the property. For example, for proving that a clock comprises three needles that represent respectively hours, minutes, seconds, it may be possible to verify that:
The clock comprises a needle that represents the hours;
The clock comprises a needle that represents the minutes;
The clock comprises a needle that represents the seconds;

This can be verified even if the three needles are not siblings which are subcomponents of the same component, for example if the clock is made of several parts, and needles of hours, minutes, seconds are each in a different part of the clock. The method thus advantageously permits to demonstrate abstract properties of an interactive component.

In a number of embodiments of the invention, the method applies to software written in a language for interactive applications structure with a tree of components and components representative of couplings. The Djnn framework is an example of framework allowing to write a program in this form. It is therefore a straightforward task to obtain the tree of components.

In other embodiments of the invention, a software is written in a language that do not natively express recursive components and interactions. In such embodiments the method 200 comprises, beforehand step 210, a preliminary step of creating a tree of components which comprises at least one component defining a coupling between two components. Said preliminary step consists in modeling software or applications which are not natively expressed as component and interactions into an interactive component similar to those discloses in European Application no 15305949.8. These embodiments advantageously permit to use the possibilities of verification of properties disclosed by the application to a larger number of languages and software. The method used in the preliminary step for modeling software or application into a tree of components depend on the characteristics of said software or application, for example the language there are written in.

In a number of embodiments of the invention, the method is used to prove non-regression during the development of an application.

In other embodiments of the invention, the method is used for validating specifications of software.

In other embodiments of the invention, the method is used for verifying that a property is verified in a context of execution of the application.

Figure 3:
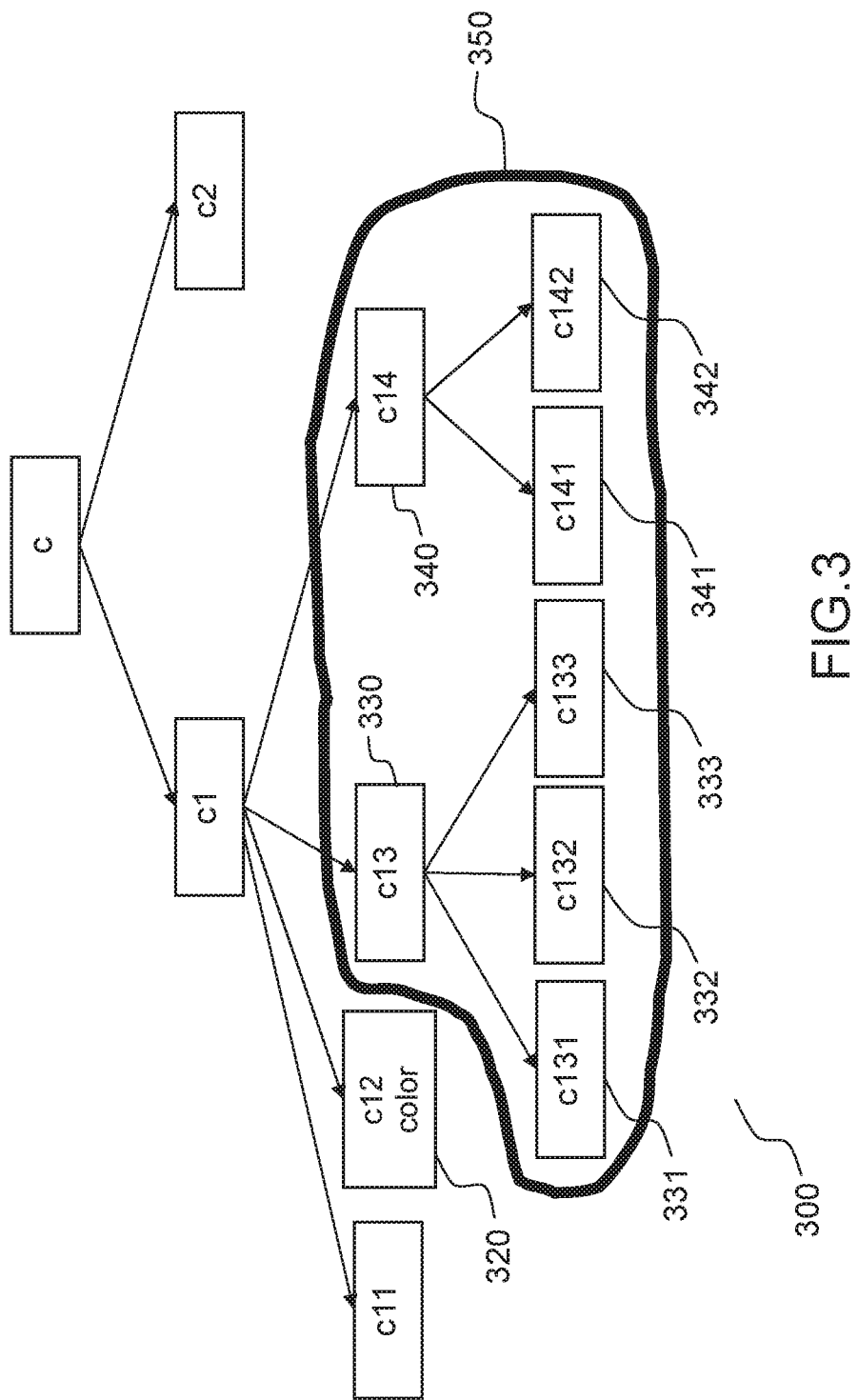
FIG. 3 displays a subpart of a tree of an interactive component in a number of embodiment of the invention.

FIG. 3 displays a subpart of a tree of an interactive component in a number of embodiment of the invention.

In some cases, it is useful to identify in a tree of components the sub-set of components impacted by another component. For example the set of components impacted by a color component is made of the components on which the color defined by the color component is applied.

We call "source component" component that defines an property to be applied to other components. We call "impacted components" the sub-set of component on which the property is applied.

The set of impacted components is made of components of the tree 300 being following sibling (younger brothers) of the source component and their descendants until another similar source component is defined.

In FIG. 3, component 320, labeled C12 is the source component. In this example the component 320 is a color component, that defines the color of all impacted components. Impacted components are following sibling components of the component 320: component 330, labeled C13 and component 340, labeled C14, and their descendants: descendants of component 330 are components 331, 332 and 333, respectively labeled C131, C132 and C133, descendants of component 340 are components 341 and 342, respectively labeled C141 and C142.

In FIG. 3, the set of components impacted by component 320 is the set of components 350. This example demonstrates how a components applies only to a subset of components of the tree, in a number of embodiments of the invention. Thus, the components on which an effect such as a color applies depend in part of the relative position of components. In accordance, in a umber of embodiments of the invention, some properties are checked according to the relative position of components.

Figure 4A:
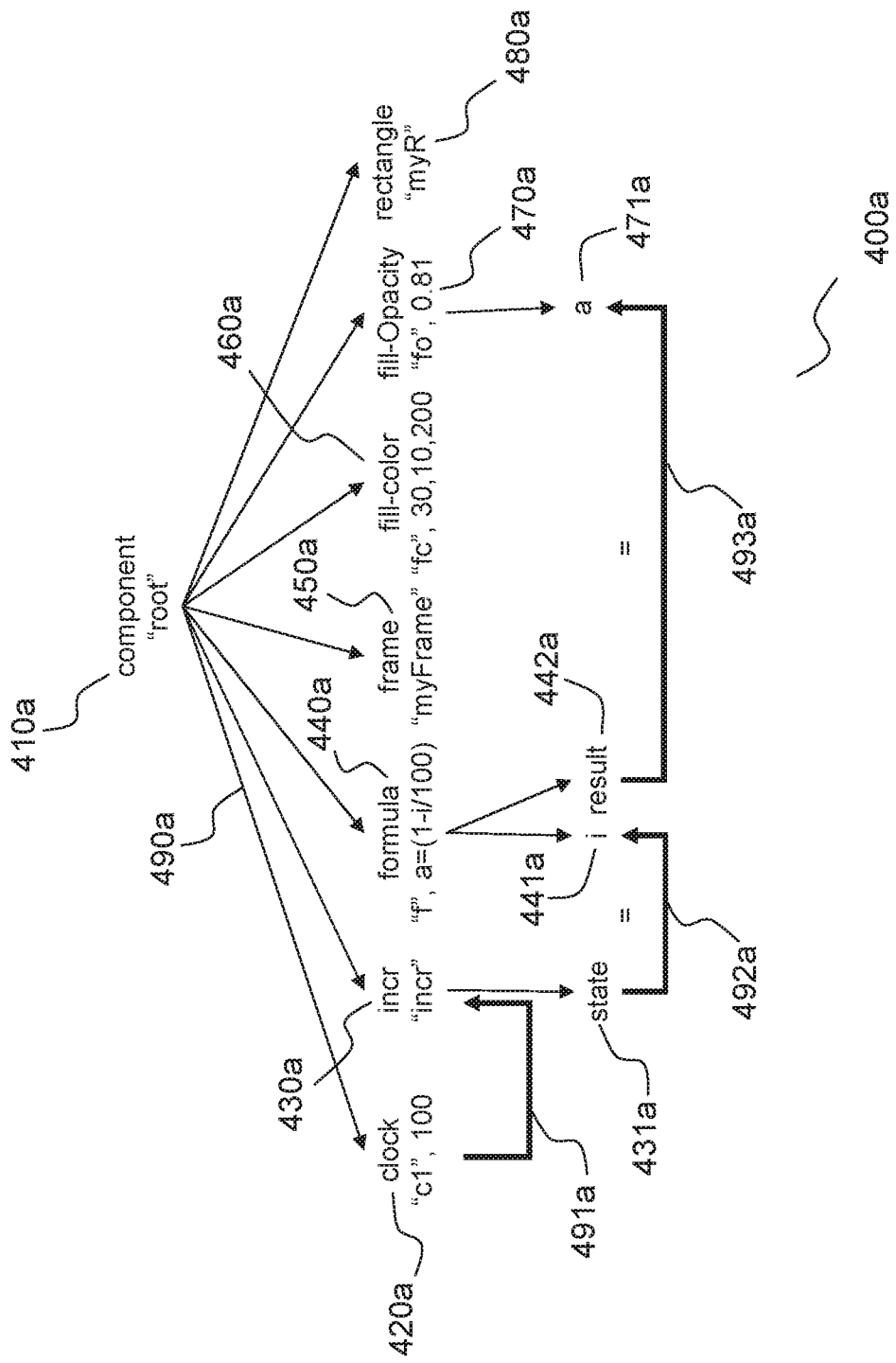
FIGS. 4a and 4b display two examples of tree of components on which the property of the presence of a plurality of attributes in a component is verified by a method according to the invention.
Figure 4B:
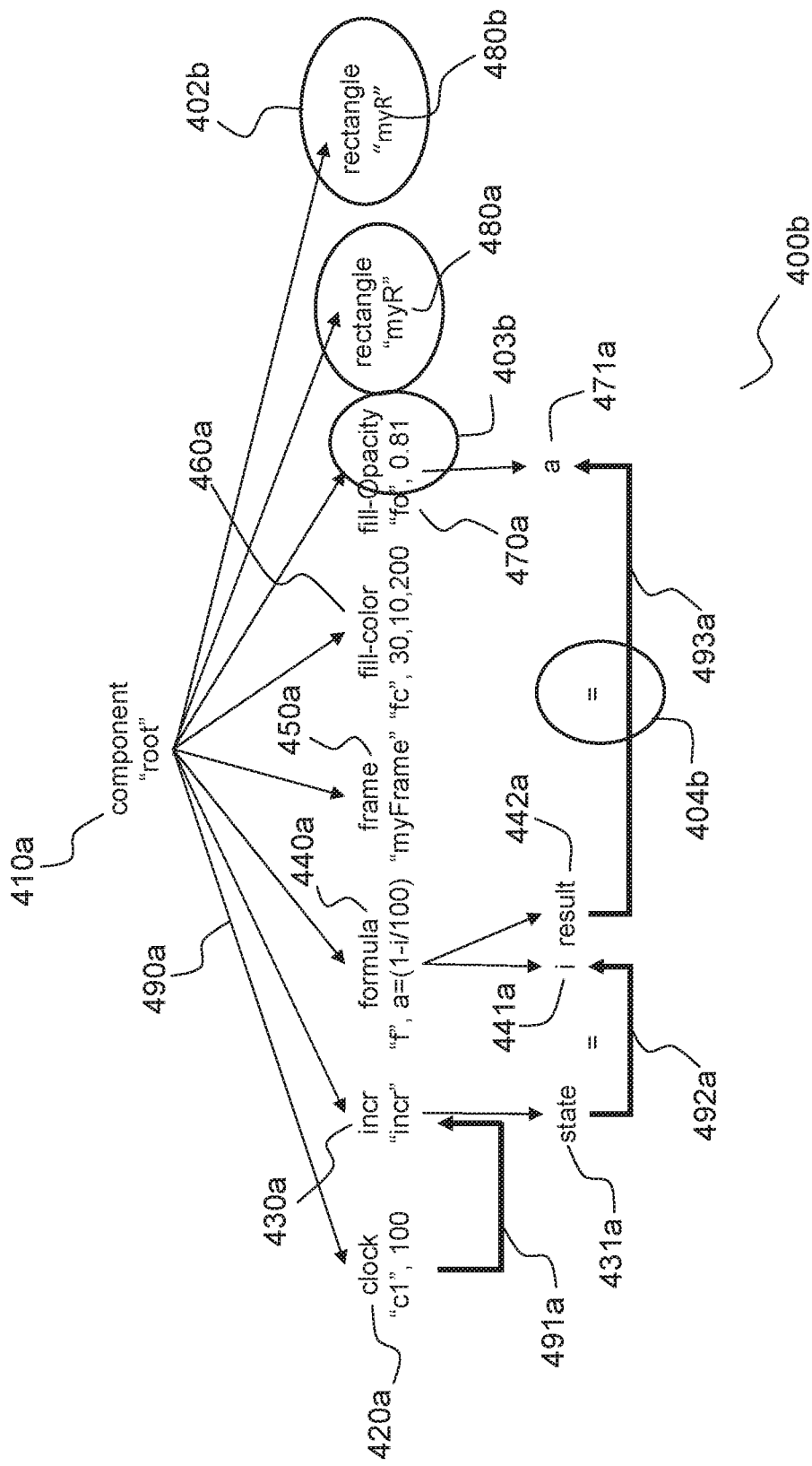

FIGS. 4a and 4b display respectively an oriented graph created from a tree of components that comprises a rectangle whose opacity increases, and some properties that can be verified on this graph by a method according to the invention.

FIG. 4a displays an oriented graph created from a tree of components that comprises a rectangle whose opacity increases.

The tree of components is for example created by parsing the XML file below:

```
<component uri="djnn://root">
    <clock name="cl" period="100"/>
    <incr name="incr" />
    <formula name="f" formula="a = (1-i/100)"/>
    <connector in="djnn://root/incr/state" out="djnn://root/f/i"/>
    <binding name="b" source="djnn://root/cl"
    action="djnn://root/incr"/>
    <frame name="frame" title="myFrame" x="50" y="50"
    width="250.00" height="250.00"/>
    <fill-color name="fc" r="30" g="10" b="200"/>
    <fill-opacity name="fo" a="0.81"/>
    <connector in="djnn://root/f/_child3/result" out="djnn://root/fo/a"/>
    <rectangle name="myR" x="10" y="10" width="150" height="100"
    rx="0.5" ry="0.5"/>
</component>
```

It comprises:
A root component 410a;
A clock 420a, which ticks every 100 ms;
An increment component 430a, which increments its state 431a at each activation;
A formula component 440a, which assigns a value equal to 1−i/100 to its result subcomponent 442a upon each activation, i being defined by an attribute of its subcomponent 441a;
Four graphics components:
A frame 450a;
A color component 460a, whose color is defined by RGB value (30,10,200). This color is applied to all graphical components being following sibling (younger brothers) of the color component and their descendants, until another color component is defined. (FIG. 3)
An opacity component 470a, whose opacity is defined by the value of its subcomponent "a" 471a, initialized at 0.81; Value of 1 means full opacity and value of 0 means full transparency. This opacity is applied to all graphical components being following sibling (younger brothers) of the color component and their descendants until another opacity component is defined (FIG. 3)
A rectangle 480a;

In a number of embodiments of the invention, when displaying a tree of components, components are traversed in a depth-first order, from left to right, and characteristic of a component may apply to sibling on its right. In this example, the rectangle 480a will have the color defined by component 460a and the opacity defined by component 470a.

The oriented graph 400a comprises all these components. In addition, it comprises arcs, that are created by parent-child relationship of the components and subcomponents in the tree, for example the arc 490a. In a number of embodiments of the invention, and arc is created for each father-child relationship in the tree, and is oriented from the father to the child.

In addition, the oriented graph comprises arcs created from control structure components, which are representative of couplings between components. For example, the edge 491a from subcomponent 420a to subcomponent 430a is created from a binding, and edge 492a from subcomponent 431a to subcomponent 441a, and edge 493a from subcomponent 442a to subcomponent 471a are both created from connectors.

The behavior of the component is the following: upon each tick of clock 420a, the binding represented by arc 491a activates increment 430a, which increments the state component 431a. This activates subcomponent 431a. The connector represented by arc 492a copies the value of state 461a into the subcomponent I 441a. This activates the subcomponent 440a. The formula is applied on the value of I 441a and the result is assigned to subcomponent result 442a. This activates subcomponent 442a, and the connector represented by arc 493a copies the value of result into a, which modifies the opacity of the rectangle.

The value of opacity progressively diminishes, since it is equal to 1−i/100, and i is incremented upon each tick of the clock. Thus, the rectangle progressively vanishes.

FIG. 4b displays the scope of some properties that can be verified on this graph by a method according to the invention.

This verification can for example be performed by a method 200 in a number of embodiments of the invention.

In this example the property that will be verified is that a rectangle is always visible, with an opacity greater than 0.5, on a scale ranging from 0 to 1.

According to a method in a number of embodiments of the invention, this property is decomposed into the conjunction of several sub-properties. Verifying the property consists in verifying the conjunction of sub-properties.

In this example, sub-properties are: 1/ existence of a rectangle 2/ no graphical shape masks the rectangle; 3/ opacity applicable to the rectangle is greater than 0.5; 4/ value of the opacity component is not subject to change According to a method in a number of embodiments of the invention, property 1/ is translated into a graph representative of said property 1/ and this graph is then checked against the graph of the component.

Graph of property 1/ is a graph made of a unique component: the rectangle. Check of the graph property 1/ against the graph of the component consists in verifying that the invariant graph is a sub-graph of the graph of the component (checking by this way the existence of the rectangle).

A second condition 402b can be defined, that no graphical shape masks the rectangle. If drawing the subcomponents is performed from the left to the right, this consists in verifying that no rectangle exists on the right of rectangle 480a. This property is verified by the oriented graph 400a. However, it would not be verified in an oriented graph 400b comprising a rectangle 480b at the right of rectangle 480a. In a number of embodiments of the invention, the condition can however be met if the rectangle 480b does not overlap with rectangle 480a. The graph representative of this second property is made of a graphical shape component and the property is verified by checking whether the graph of property 2/ is not a sub graph of the following sibling sub-graph of the rectangle.

A third condition 403b can be defined, that the opacity applicable to the rectangle is greater than 0.5. This condition is met by the oriented graph 400b. The graph of this $3^{rd}$ property is made of a unique component opacity. It is verified by searching in the graph this component with an opacity value greater or equal to 0.5 and verifying that the rectangle component is one of its following sibling sub-components.

A fourth condition 404b can be defined, that the value of the opacity is not subject to change. In the graph 400a and this condition is not met, since the connector 404b modifies the value of the opacity. The graph of the property 4/ is made of the opacity and clock components, and an arc between clock component and opacity component. The verification consists in checking whether this invariant graph is a sub-graph of the transitive closure of the graph.

FIGS. 4a and 4b have been described in relation with software components. However, as explained above, the very same principle of verification of properties is applicable to other types of components. For example, it could be possible to replace the "clock" component 420a by a component representative of a human series of actions, and keep the binding 491a to the "increment" component 430a. Thus, the "increment" component 430a would be activated each time the human provides an input to the interactive software, for example each time a user clicks on a button. Similarly, this applies to procedures, component 430a being activated each time the user is required to click on a button.

This embodiment advantageously allows to verify if certain properties are verified upon defined interactions with a user. In this example, it is for example possible to verify that a rectangle is always visible, with an opacity greater than 0.5, on a scale ranging from 0 to 1, in a manner very similar to the software components.

This embodiment can also be used to verify more complex interactions between a human and interactive software. For example, it is possible to define components representative of a procedure such as "when the alarm rings, press the red button" or a possible behavior such as "if not in inattentional deafness state, the user will press the red button when the alarms ring". This behavior can be expressed by a binding between the activation of the alarm and the activation of the button, or by a more complex state machine. Thus, the complete interaction can be verified, provided that the human operator interacting with the software has a behavior compatible with the procedure or the possible behavior represented as a component.

This embodiment advantageously permits to verify properties of complex interactions between a user and interactive software. It can for example be used to verify that interactive software complies with a specification of interaction, or that a procedure is consistent with both a software system and an expected behavior.

This embodiment can also be used to verify physical and informational interactions between humans and objects other than software, for instance when designing organizations and procedures using documents, signal lights, waiting lines, etc. After representing the behavior of these humans, organizations, procedures and artifacts as components, one can apply the same type of property verification.

This embodiment can also be used to store a component representation of the behavior of humans, procedures and organizations in an interactive software, along with a set properties to monitor on this behavior, so that upon the detection of the activation and deactivation of given sub-components of these components that change the monitored properties, the interactive software can adapt its own behavior accordingly. This obtained, for instance, by representing the said properties as components in the software, and by binding actions to their changes.

EXAMPLES OF APPLICATIONS OF THE INVENTION

The invention can be used in by various actors in various system engineering processes.

As an example, the invention can be used during the independent development of interactive components: developers use the invention during the design of their components as a method for verification of properties fulfilled by said components. Properties can be defined at any time during the design of said components, including before the design, during the design when additional requirements are identified, or when a component is being debugged and an error is traced back to an implicit requirement that was not fulfilled and that must be made explicit to avoid regressions.

Another way to use the invention is during the integration of components previously developed. Integrators may define and check additional properties for the components they wish to reuse as sub-components of their own components, especially when said properties are essential to the proper work of their own components. Once the properties are defined for it, the integrators can also decide to replace a sub-component by another and check that the new sub-component also holds the properties.

The two previous methods can be grouped in a development environment aimed at defining and producing interactive software. Various actors of the specification, development and validation of a software product can produce in parallel a collection of components and component properties, with the collective goal that their work results in a software product in which all defined properties are fulfilled. The development environment can maintain a list of properties that are not yet fulfilled, by constantly monitoring changes to components and re-checking properties.

The invention can also be used to support a part of certification process. For example, according to the language in ISO standard DO178 titled "SOFTWARE CONSIDERATIONS IN AIRBORNE SYSTEMS AND EQUIPMENT CERTIFICATION", the invention can be used to provide "evidence that the system is complete and correct with respect to its requirements" and to support "determination of which code, software requirements or software architecture satisfy the next higher level of software requirements".

Alternatively, the invention can be used in a specification and acquisition process. A company can create a software prototype as a collection of software components iteratively, said prototype being destined to capture its requirements. It can then formulate properties on the significant software components that constitute said prototypes, and deliver the resulting collection of properties to a third party vendor from which it desires to acquire an industrial version of the prototype. When the software vendor delivers the resulting product, the company can check that the properties are fulfilled. This ensures that both the benefits of external sourcing and the benefits of a specification are present in the final product.

Alternatively, the invention can be used in compilers of interactive software, where said interactive software is written in a language that implements the interactive component model used in the invention. A compiler can check the properties of components and emit errors when properties are not fulfilled.

Alternatively, the invention can be used in tools dedicated to unit tests, where the definition of component properties would be a sub-set of the language provided to the programmers of unit tests. Said unit tests could therefore combine the simulation of an execution environment and the checking of properties.

Another way to use the invention is to use the invention by modeling as a collection of interactive components all or part of the environment in which a software component is destined to be used, then to combine said model and said software component in a larger component, then to define and check properties on said larger component. This allows for instance to check that a software component is fit for a task or a user activity, by modeling said task or activity. The same method can also be used for checking compatibility of a software component with a hardware platform.

An alternative use of the invention is to define properties of the environment in which a software component must be used, so as to document the conditions of reuse of said software component. For instance, it is possible to state in a property that a graphical button must be used in an environment in which at least one pointer is available. Engineers or users of said graphical button can then obtain a model of the computer and operating system in which they wish to reuse said button, and check if the property is held by said model of the computer and operating system.

An alternative use of the invention is in the run-time software execution system that is used to execute interactive components. Said execution system can dynamically check properties on components that it receives from its environment, for example when loading components from files, or receiving them from network connections, or creating them upon the detection of hardware devices or other elements of the execution context. In addition, said execution system can provide an application-programming interface (API) that allows programmers to define properties and to define actions to be performed on dynamically created components. This allows programmers to create automatic adaptation mechanisms in their software.

Through the application of the invention, a repository of properties can be defined. For instance, the vendor of a development environment can propose a collection of properties that are deemed necessary for components to execute properly, and suggest programmers to check said properties on their components. More specific properties can be defined for specific classes of components or specific application domains. For example, regulatory bodies of the civil aviation sector can define interaction-oriented properties that specific interactive aircraft cockpit equipments must possess so as to be used for transporting passengers. The repository can also offers means for searching, classifying, editing and modifying the properties according to these criteria.

Alternatively, component properties can be used as a method for indexing and retrieving interactive components in a repository of components. Said repository could check the contents of a repository of properties against any component uploaded by a vendor, index said component with all those properties that it holds, and then allow users to retrieve components by selecting the desired properties, or to navigate its contents according to the available properties.

It is also possible to successively add properties to verify, when new interactions need to be defined or when new requirements are identified. It can notably be the case when some components are representative of human behavior. In this case, it may be difficult to envision all properties to verify at the initial development of the software, and it may thus be interesting to add properties relative to an interaction between a user and interactive software based on feedback of users of the interactive software. Interactive properties to verify can then be successively added, and a method of the invention can be used to verify, at each version of the interactive software, that it verifies all the properties, provided that the user of the software performs the desired behavior.

The same principle can be used for checking interactive software against specifications. The invention then provides a powerful tool for verifying that successive versions of interactive software comply with successive versions of a specification relative to interactions between a user and the software.

The same principle can be used for checking successive versions of procedures defined for using successive versions of interactive software, with successive versions of requirements or specifications.

The same principle can be used for checking successive versions of procedures and organizations against successive versions of requirements and specifications, by replacing components representing software and hardware with components representing organizations and procedures, and checking their properties or the properties of the system they constitute along with human behaviors.

The examples described above are given as illustrations of embodiments of the invention. They do not in any way limit the scope of the invention which is defined by the following claims.

The invention claimed is:

1. A method for verifying a property of an interactive component, comprising:
creating a first oriented graph, representative of the interactive component, the interactive component being represented as a tree of child components, the tree of child components comprising a control structure child component defining a coupling between a first child component and a second child component, the second child component being activated upon the activation of the first child component, nodes of the first oriented graph comprise the first child component and the second child component, creating the first oriented graph comprising:
creating a first arc between the interactive component and a child of said component;
creating a second arc between the first child and the second child, said second arc being representative of the activation of the second child component upon the activation of the first child component;

obtaining a second predefined graph, representative of the property, the property being relative to an existence or an absence of an output of the interactive component depending upon at least one input of the interactive component;

verifying if the property is fulfilled by:
  verifying if the second predefined graph is present in the first graph, if said property is representative of an existence of said output of the interactive component depending upon at least one input of the interactive component;
  verifying if the second predefined graph is absent in the first graph, if said property is representative of an absence of said output of the interactive component depending upon at least one input of the interactive component;

if the property is not fulfilled, raising an error and sending said error to at least one of:
  a debugger,
  a development or design environment,
  a compiler,
  a software testing tool,
  a run-time environment executing the software.

2. The method of claim 1, wherein obtaining a second graph, representative of the property comprises retrieving said second graph in a library.

3. The method of claim 1, wherein obtaining a second graph, representative of the property comprises creating said second graph in a library.

4. The method of claim 1, wherein verifying one of the presence and the absence of the second graph further comprises verifying a value of an attribute of a node of said second graph.

5. The method of claim 4, further comprising verifying if said value of an attribute is subject to change upon the presence of the second arc.

6. The method of claim 1, wherein displaying the interactive component comprises displaying a subset of child components.

7. The method of claim 6, wherein an order of display is determined by the structure of the tree.

8. The method of claim 7, wherein the order of display is the order of a depth-first search algorithm.

9. The method of claim 1, wherein the property is relative to the structure of the interactive component.

10. The method of claim 1, wherein the property is relative to the behavior of the interactive component.

11. The method of claim 1 which further comprises associating a condition of a type of a node with the property of the interactive component.

12. The method of claim 1 which further comprises associating a condition of a value of an attribute of a node with the property of the interactive component.

13. The method of claim 1, wherein at least one component is representative of one of a series of action to be performed by a human, or a procedure to be followed by a human.

14. A computer program product stored in a non-transitory computer storage medium for verifying a property of an interactive component, said computer program product comprising:
  code instructions for creating a first oriented graph, representative of the interactive component, the interactive component being represented as a tree of child components, the tree of child components comprising a control structure child component defining a coupling between a first child component and a second child component, the second child component being activated upon the activation of the first child component, nodes of the first oriented graph comprise the first child component and the second child component, creating the first oriented graph comprising:
    creating a first arc between the interactive component and a child of said component;
    creating a second arc between the first child and the second child, said second arc being representative of the activation of the second child component upon the activation of the first child component;
  code instructions for obtaining a second predefined graph, representative of the property, the property being relative to an existence or an absence of an output of the interactive component depending upon at least one input of the interactive component;
  code instructions for verifying if the property is fulfilled by:
    verifying if the second predefined graph is resent in the first graph, if said property is representative of an existence of said output of the interactive component depending upon at least one input of the interactive component;
    verifying if the second predefined graph is absent in the first graph, if said property is representative of an absence of said output of the interactive component depending upon at least one input of the interactive component;
  code instructions for, if the property is not fulfilled, raising an error and sending said error to at least one of:
    a debugger,
    a development or design environment,
    a compiler,
    a software testing tool,
    a run-time environment executing the software.

15. A processor configured for verifying a property of an interactive component, said processor being configured for:
  creating a first oriented graph, representative of the interactive component, the interactive component being represented as a tree of child components, the tree of child components comprising a control structure child component defining a coupling between a first child component and a second child component, the second child component being activated upon the activation of the first child component, nodes of the first oriented graph comprise the first child component and the second child component, creating the first oriented graph comprising:
    creatin a first arc between the interactive component and a child of said component;
    creating a second arc between the first child and the second child, said second arc being representative of the activation of the second child component upon the activation of the first child component;
  obtaining a second predefined graph, representative of the property, the property being relative to an existence or an absence of an output of the interactive component depending upon at least one input of the interactive component;
  verifying if the property is fulfilled by:
    verifying if the second predefined graph is present in the first graph, if said property is representative of an existence of said output of the interactive component depending upon at least one input of the interactive component;
    verifying if the second predefined graph is absent in the first graph, if said property is representative of an absence of said output of the interactive component depending upon at least one input of the interactive component;

if the property is not fulfilled, raising an error and sending said error to at least one of:
a debugger,
a development or design environment,
a compiler,
a software testing tool,
a run-time environment executing the software.

* * * * *